United States Patent
Godwin et al.

(10) Patent No.: US 6,736,892 B2
(45) Date of Patent: May 18, 2004

(54) PIGMENT DISPERSIONS CONTAINING STYRENATED AND SULFATED PHENOL ALKOXYLATES

(75) Inventors: Edward R. Godwin, Davidson, NC (US); Paul David Weipert, High Point, NC (US)

(73) Assignee: Ethox Chemicals LLC, Greenville, SC (US)

(*) Notice: Subject to any disclaimer, the term of this patent is extended or adjusted under 35 U.S.C. 154(b) by 0 days.

(21) Appl. No.: 10/195,520

(22) Filed: Jul. 16, 2002

(65) Prior Publication Data
US 2003/0101910 A1 Jun. 5, 2003

Related U.S. Application Data

(60) Provisional application No. 60/306,151, filed on Jul. 19, 2001.

(51) Int. Cl.[7] .................................................. C08R 5/00
(52) U.S. Cl. ................. 106/499; 106/413; 106/447; 106/448; 106/453; 106/459; 106/460; 106/473; 106/474; 106/493; 106/495; 106/496; 106/497; 106/498; 106/503
(58) Field of Search ................................. 106/413, 447, 106/448, 453, 459, 460, 473, 474, 476, 493, 495, 496, 497, 498, 499, 503

(56) References Cited

U.S. PATENT DOCUMENTS 5,125,968 A * 6/1992 Takimoto et al. ......... 106/31.75

FOREIGN PATENT DOCUMENTS

| EP | 000827990 A2 | * | 3/1998 |
| JP | 61-213273 | * | 9/1986 |
| JP | 10-95946 | * | 4/1998 |
| JP | 11-202540 | * | 7/1999 |
| JP | 11-202541 | * | 7/1999 |
| JP | 11-202542 | * | 7/1999 |
| JP | 11-202556 | * | 7/1999 |
| JP | 11-302585 | * | 11/1999 |

* cited by examiner

*Primary Examiner*—Anthony J. Green
(74) *Attorney, Agent, or Firm*—Isaac A. Angres

(57) ABSTRACT

The present invention provides sulfated and carboxymethylated surfactants and dispersants produced by reacting a styrenated phenol alkoxylate with sulfamic acid and then neutralizing with a base such as ammonium hydroxide. The instant invention also provides pigment dispersion comprising: (a) a pigment; and (b) a dispersant based on sulfated and carboxymethylated styrenated phenol alkoxylates. Carbon black dispersions are also provided containing carbon black and the dispersants of the invention.

4 Claims, No Drawings

PIGMENT DISPERSIONS CONTAINING STYRENATED AND SULFATED PHENOL ALKOXYLATES

This application claims the benefit of priority from U. S. provisional application No. 60/306,151 filed Jul. 19, 2001.

FIELD OF INVENTION

The present invention pertains to a process of preparing an aqueous dispersion containing a pigment uniformly distributed throughout. In particular, the invention relates to a process of dispersing a pigment in an aqueous system with a styrenated and sulfated phenol ethoxylates. The invention is also directed to aqueous carbon black dispersions containing carbon black and surfactants based on sulfated styrenated phenol alkoxylates, in addition to water. The dispersions are produced by dispersing the carbon black and the other constituents in water, using bead mills, ultrasonic mills and/or an ultra-turrax. The aqueous carbon black dispersions can be used in many applications such as printing inks including ink-jet inks or writing inks. Also the carbon black dispersions are also useful in lubricating applications.

The present invention also relates to pigment dispersions free from organic solvents and containing a carboxymethylated styrenated phenol alkoxylate as dispersing agent. The pigment dispersion can be used in paints based on water as well as organic solvents.

The present invention also provides homogeneous pigment dispersions which are completely free from organic solvents and which, without causing flocculations which may cause unacceptable differences in color, may be used in water-based paints as well as paints containing organic solvents.

This invention also relates to pigment dispersions suitable for pigmenting hydrophilic as well as hydrophobic media. The present invention further relates to methods of preparing inorganic pigment dispersions useful in the manufacture of latex paints, and latex paints prepared therewith.

BACKGROUND OF THE INVENTION

One of the most difficult pigments to disperse and stabilize in a waterborne coating formulations or rubber compositions is carbon black, because of its enormous surface area and high oil absorption. Additionally, especially where a conductive carbon black pigment is to be utilized, it is important that the reduction of the electrostatic properties be minimized, and that the other physical characteristics of the final coating are not deleteriously affected by the particular pigment dispersant employed.

The products commonly employed in the prior art as carbon black dispersants in coatings are salts of an acrylic acid copolymer, acetylenic diol surfactants, or polyalcohol ethers which fit into various classes of wetting and dispersing agents, (Calbo, Handbook of Coatings Additives, Dekker pg. 516). Such additives could be called on to function as more than a dispersant and can also act in one or more of the following ways: a) to prevent flocculation, b) to prevent hard settling, c) to improve jetness/color/gloss, d) to control viscosity, and/or e) to improve wetting of the base resin.

Various considerations are important in determining the usefulness of any additive as a dispersing agent for use with a carbon black or with other pigments, depending upon the product into which such a dispersion is to be incorporated. When used throughout this application the terms pigment(s) or pigment dispersion(s) are intended to encompass various materials which may be intended to impart either color and/or serve some other function, such as for example the use of carbon black in rubber where, in addition to adding color, such also acts as a reinforcing agent.

One of the most important considerations in determining whether a particular dispersant will be useful for use with a given pigment or pigments when such a pigment is to be used in a paint or coating composition is whether such a dispersant/pigment combination will or will not impart a conductive nature or characteristic to the dried paint film or coating into which it has been added.

The automotive industry is replacing and will continue to replace exterior metal body panels on vehicles with plastic and composite body panels. Some reasons for this change are weight reduction, flexibility of design, and lower tooling costs. The replacement of metal body panels by plastics and composites is not without difficulties.

One problem of note is the electrostatic spray painting of plastics. Electrostatic spray painting is the preferred manner of applying automotive topcoats. Spray painting normally gives the best appearance to the vehicle and the electrostatic technique assures the most economical use of the material. The problem arises because plastics do not paint well electrostatically unless a conductive primer is used.

Amongst the most important considerations for determining the utility of any dispersant to be used in conjunction with conductive carbon blacks are the following: the inherent rheological stability of the dispersion, both alone and when added to a formulated paint; resistance to flocculation of the carbon black/dispersant mixture and in the final paint or coating; and ability to achieve low viscosity at high pigment loadings.

The various prior art references of which the applicants are aware which relate to dispersing agents for pigment additives, such as carbon blacks, suffer from a number of shortcomings. The most significant shortcomings of the carbon black dispersants of the prior art, including those used for conductive carbon blacks, are: high levels of dispersant may be required which tends to detrimentally affect the physical properties of formulated paints, such as adversely affecting the resultant humidity resistance, yellowing upon exposure to UV light, loss of cure in melamine cross-linked systems, and other undesirable effects; inability to prevent reflocculation of carbon black, resulting in the loss of electrical conductivity in dried paint films; and incompatibility of the dispersant with the particular resin system selected for use in the final paint formulation.

Additionally, more and more paints are produced which are water-based and completely free from organic solvents, such as glycol ethers. When toning these paints to the desired colour, use is made to a great extent of pigment dispersions, which can be used both for water-based paint and for paint based on organic solvents. The pigment dispersions are normally composed of pigments, fillers, dispersing agents and an aqueous phase in the form of ethylene glycol, di- and triethylene glycol, propylene glycol, dipropylene glycol, tripropylene glycol and glycerol. In most cases, the dispersing agent is a nonionic surface-active compound or a combination of nonionic and anionic surfactants. For environmental reasons, it is however desirable that the pigment dispersions are solvent-free.

The shortcomings of the prior art dispersing agents noted above may be overcome by employing certain sulfated and/or carboxymethylated styrenated phenol alkoxylates in accordance with the present invention.

OBJECTS OF THE INVENTION

It is a first object of the present invention to provide novel pigment dispersions incorporating novel surfactants.

It is another object of the instant invention to provide novel pigment dispersions containing surfactants based on sulfated styrenated phenol alkoxylates.

A further object of the invention is to provide novel carbon black dispersions containing novel surfactants.

A still further object of the invention is to provide novel carbon black dispersions incorporating sulfated styrenated phenol alkoxylates.

An additional object of the invention is to provide novel pigment dispersions incorporating sulfated styrenated phenol ethoxylates.

A still further object of the invention is to provide carbon black dispersions containing surfactants based on sulfated styrenated phenol ethoxylates.

An additional object of the present invention is sulfated styrenated phenol alkoxylates.

Another main object of the present invention is to provide pigment dispersions incorporating sulfated styrenated phenol ethoxylate/propoxylate surfactants.

Another object of the present invention is to provide carbon black dispersions incorporating sulfated styrenated phenol ethoxylate/propoxylate surfactants.

A still further object of the present invention is to provide graphite dispersions incorporating sulfated styrenated phenol ethoxylate/propoxylate surfactants.

An additional object of the invention is carbon black dispersions incorporating craboxymethylated styrenated phenol ethoxylate/propoxylate surfactants.

Still, an additional object of the present invention is carboxymethylated styrenated phenol alkoxylates.

Still, another object of the invention are pigment dispersions having a very high tinctorial strength and brilliance, an excellent levelness and covering power in opaque applications.

These and other objects of the present invention will more readily become apparent from the description and examples which follow.

SUMMARY OF THE INVENTION

The present invention is directed to a pigment dispersion comprising: (a) a pigment; and (b) an anionic surfactant selected from the group consisting of surfactants having the formulae:

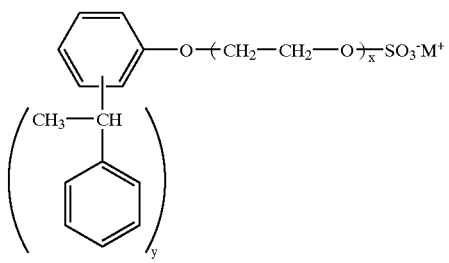

(i)

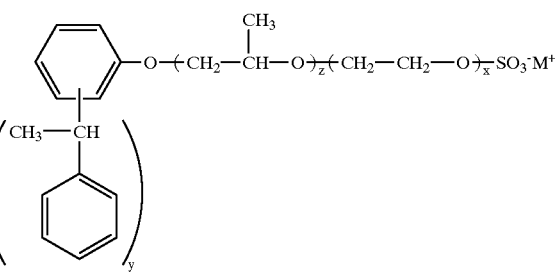

(ii)

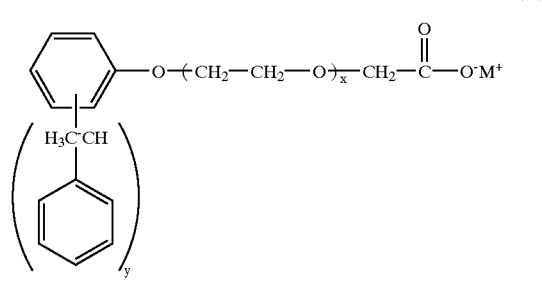

(iii)

wherein x=1–70; y=1, 2, 3; z=1–70 and $M^+$ is selected from the group consisting of $NH_4^+$, $Na^+$, and $K^+$, $C_1$-$C_4$ alkyl ammonium, $C_1$-$C_4$ dialkylammonium, $C_1$-$C_4$ trialkylammonium, monoethanolammonium, diethanolammonium and triethanolammonium.

The instant invention is also directed to a coloring pigment dispersion which is free from organic solvents comprising: (a) 1.0–60% by weight of a coloring pigment; (b) 5–30% by weight of an anionic surfactant selected from the group consisting of surfactants having the formulae:

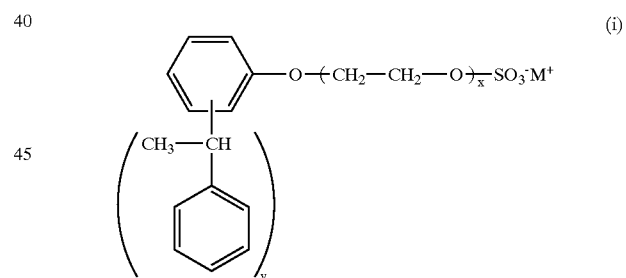

(i)

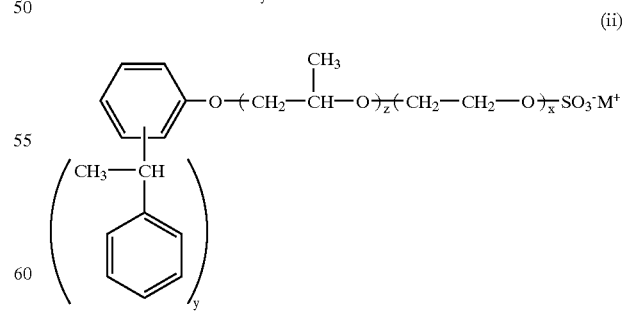

(ii)

-continued (iii)

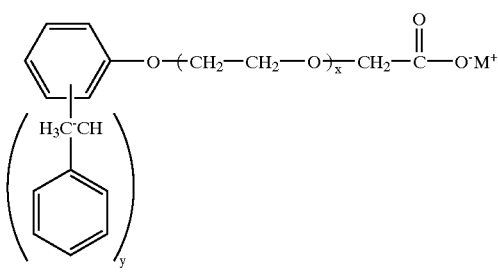

wherein x=1–70; y=1, 2, 3; z=1–70 and M⁺ is selected from the group consisting of $NH_4^+$, $Na^+$, and $K^+$, $C_1$–$C_4$ alkyl ammonium, $C_1$–$C_4$ dialkylammonium, $C_1$–$C_4$ trialkylammonium, monoethanolammonium, diethanolammonium and triethanolammonium; (c) 20–75% by weight of water; and (d) 0–5% by weight of auxiliary additives selected from the group consisting of antifoaming agents, and nonionic surfactants.

The present invention is also directed to an aqueous carbon black dispersion comprising, in addition to water, the following components:

5 to 50% by weight of carbon black; and 0.5 to 30% by weight of an anionic surfactant selected from the group consisting of surfactants having the formulae:

(i)

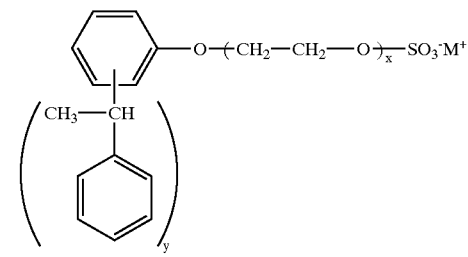

(ii)

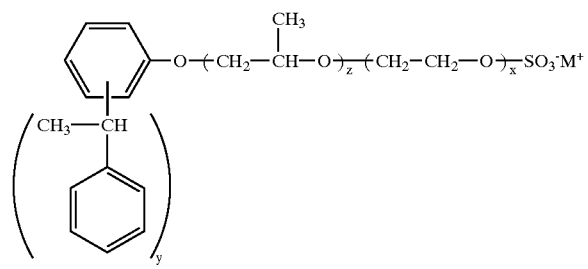

(iii)

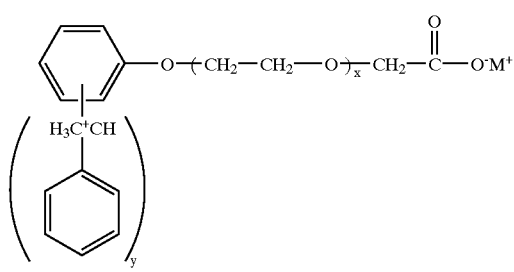

wherein x=1–70; y=1, 2, 3; z=1–70 and M⁺ is selected from the group consisting of $NH_4^+$, $Na^+$, $K^+$, $C_1$–$C_4$ alkyl ammonium, $C_1$–$C_4$ dialkylammonium, $C_1$–$C_4$ trialkylammonium, monoethanolammonium, diethanolammonium and triethanolammonium.

DESCRIPTION OF THE PREFERRED EMBODIMENTS

The dispersants of the present invention are manufactured by reacting a styrenated phenol alkoxylate of the formulae (i) or (ii)

(i)

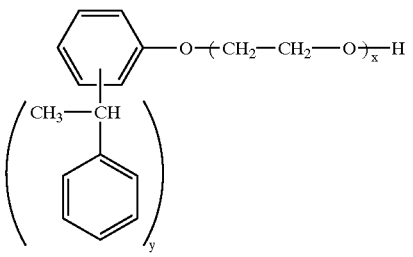

(ii)

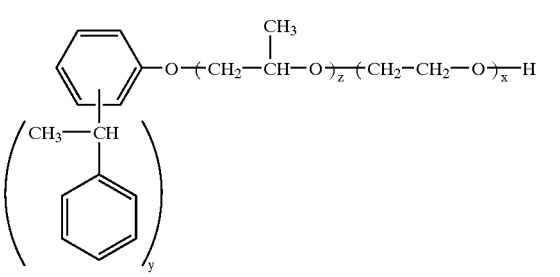

wherein x=1–70; y=1, 2, 3; z=1–70 with an equimolar amount of sulfamic acid in the presence of dicyandiamide as a catalyst. The reaction is conducted in a suitable reactor at a temperature range of about 100°–130° C., more preferably at a temperature range of 110°–125° C. and most preferably at a temperature range of 115°–120° C.

In the case of the carboxymethylated derivatives, the styrenated phenol alkoxylate of formulae (i) and (ii) are reacted under alkaline conditions (KOH or NaOH) with chloroacetic acid at temperatures in the range of 100°–130° C. In another embodiment, the alkoxylate is reacted with a strong base such as sodium hydride and the resulting sodium salt is then reacted with the chloroacetic acid followed by neutralization with a base selected from the group consisting of sodium hydroxide, potassium hydroxide, ammonium hydroxide, $C_1$–$C_4$ alkyl amines, $C_1$–$C_4$ dialkylamines, $C_1$–$C_4$ trialkylamines, monoethanolamine, diethanolamine and triethanolamine.

The styrenated phenol alkoxylates are intended to include compounds having the following chemical structures:

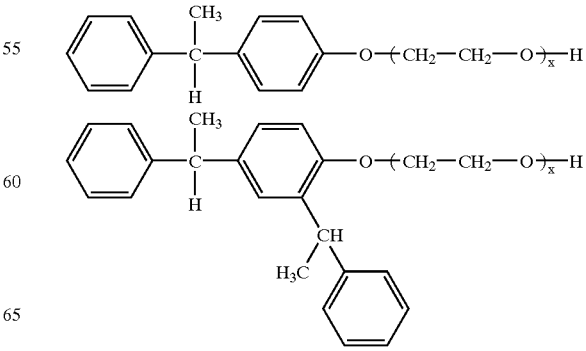

-continued

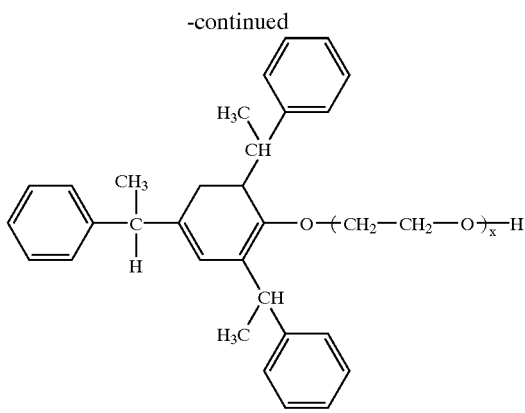

The propoxylated as well as the mixed product ethoxylate/propoxylate are also intended to be included withinb the scope of the present invention.

The pigments which may be dispersed according to the invention may consist of organic as well as inorganic pigments. Suitable inorganic pigments are, for example, iron oxides, chromium oxides, titanium oxides, chromium titan yellow, carbon black and mixtures thereof. Organic pigments are, for instance, azo, phthalo, cyanide and quinacridon pigments and derivatives from thionindigo, dioxazine and mixtures thereof. Mixtures of organic and inorganic pigments are also suitable for making the dispersions of the present invention.

Pigment blacks with an average primary particle diameter of 8 to 80 nm, preferably 10 to 35 nm, and a DBP number of 40 to 200 ml/100 g, preferably 60 to 150 ml/100 g, can be used as the carbon black. In a preferred embodiment of the invention, gas blacks with an average primary particle diameter of 8 to 30 nm, preferably 10 to 25 nm, can be used.

The pigment dispersions according to the invention contain 1 to 65% by weight, preferably 30 to 50% by weight, of pigment, 2 to 35% by weight, preferably 5 to 30% by weight, of the sulfated styrenated phenol alkoxylate products, 0 to 20%, preferably 0 to 5%, of additional nonionic or anionic surface-active agents, 5 to 20% by weight of water-retaining agents and 15 to 40% by weight of water.

The pigment dispersion composition of the present invention is prepared by adding a pigment to an aqueous solution of a pigment dispersant, disaggregating and dispersing the pigment in the solution by means of a dispersing machine such as roll mill, ball mill or sand mill, diluting the resultant dispersion to a desired concentration and removing larger particles therefrom by way of centrifugation, Scharples-type centrifugation and filtration. If a desired particle-size distribution cannot be obtained by the first particle classification process, the dispersing process and particle classification process are repeated until the desired particle-size distribution is obtained. In most instances, if the proportion of particles impassable through a sieve having a mesh size of 300 nm is not greater than 30%, there is no need for particle classification. Thus, the pigment contained in the dispersion has a median particle size of not greater than 250 nm, preferably not greater than 200 nm with not greater than 30% of the pigment particles being impassable through the sieve having a mesh size of 300 nm.

Also, the pigment dispersion according to the invention can be produced by first preparing a pigment-free mixture of the surface-active compounds, the water, the antifoaming agents and any other additives, and subsequently adding the pigment portion which is dispersed in the mixture. The dispersion can be carried out by means of a dissolver or grinder, for instance a ball grinder or roller mill.

The pigment dispersions according to the invention can be employed for all purposes and are excellently suitable for the production of emulsion paints based on polyvinyl acetate, polyvinyl acetate copolymers, styrene-butadiene copolymers, polyvinyl propionates, acrylic and methacrylic acid ester polymers, saponified alkyd resins and oil emulsions; for the production of wallpaper paints based on cellulose derivatives such as methylcellulose, hydroxymethylcellulose and carboxymethylcellulose, and for the production of printing inks which contain, as binders, mainly saponified natural resins, such as shellac, saponified water-soluble synthetic resins or acrylate binder solutions.

EXAMPLES

The present invention is illustrated by the following Examples, but should not be construed to be limited thereto. In the Examples, "part" and "%" are all part by weight or % by weight unless specified otherwise.

The starting material for making the sulfated as well as the carboxymethylated styrenated phenol ethoxylate surfactants is a styrenated phenol ethoxylate having the following chemical structure:

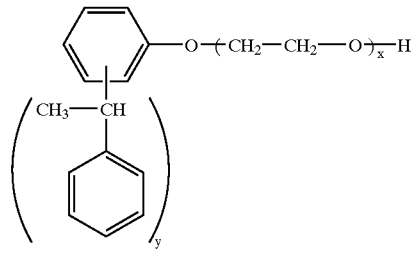

wherein y is about 2.0–2.5, x is about 9–15. The above material is sold by Ethox Chemicals under the designation Ethox 2938.

The product is used around 9%, based on 100% theoretical yield of pigment in an aqueous dispersion, by weight. That is, for a 33% active pigment dispersion, use roughly 3% dispersant. The product has been successfully used in acrylic latex, styrene acrylic latexes, as an emulsifier, and UV absorbers for the textile industry. It is also useful for making dispersions of kaolin clays and inorganic pigments, and as a dispersant for magnetic tape media, and as a vermiculite dispersant for polyester film. The dispersant also affects the rheological properties of the Joncryl Polymers from Johnson, thus lessening their usage rate, but allowing the same adhesion. The dispersant of the invention lowers the particle size of the pigment or particle, while retarding re-agglomeration, which inturn promotes a lower viscosity with increased stability The product offers shorter milling times and may allow for the use of cheaper less refined pigments.

The following Examples are illustrative of the invention.

Example 1

The amount of components as outlined below are used in the preparation of a sulfated styrenated phenol ethoxylate having x=11–12 and and y=2.0–2.3.

| COMPONENT | AMOUNT |
| --- | --- |
| Ethox 2938 (anhydrous) | 161.3 lbs |
| Sulfamic Acid | 18.9 lbs |
| Sodium Borohydride | 8 gms |
| Dicyandiamide | 166 gms |
| Monothanolamine | 1.0 lbs |
| Dimethylformamide | 118.4 |

To a clean reactor, charge about 179 lbs of the ETHOX 2938 so that after drying there will be approximately 161.3 lbs. of anhydrous material. Dry with $N_2$ and heat to 110–120° C. to a water content % H2O<0.1%. When dry, cool to 80° C. Add the dicyandiamide and the sodium borohydride. Then add 18.9 lbs of Sulfamic Acid and heat at 115–120° C. until the % sulfate is >90%. Cool to 80° C. and then add 1 lbs of Monoethanolamine and 118.4 lbs of DMF. The pH of a 10% solution in DI water should be adjusted to 6.5–7.5. The % solids is 59–61. Filter any salts from product to a clear solution.

Example 2

The following components are reacted using the procedure of Example 1.

| COMPONENT | AMOUNT |
| --- | --- |
| Ethox 2938 | 53.2530 gms |
| NaBH4 | 0.0096 gms |
| Dicyandiamide | 0.2026 gms |
| Sulfamic Acid | 7.0438 gms |
| Monoethanolamine | 0.4895 gms |
| Propylene Glycol | 9.6431 gms |
| Water | 29.2112 gms |
| Citric Acid | 0.0472 gms |
| | 100.0000 |

The resulting product is a clear yellow liquid which is clear when mixed in water. The color rating is—2 Garder. A 10% solution has a pH (DI water)—7.5 and the % Solids content is 63.09%.

Example 3

The following components are reacted using the procedure of Example 1.

| COMPONENT | AMOUNT |
| --- | --- |
| Ethox 2938 | 1100 g |
| NaBH4 | 0.13 g |
| Dicyanamide | 4.27 g |
| Sulfamic | 74.93 g |
| Monoethanolamine | 5.23 g |
| Citric Acid | 3.0 g |

Example 4

The following components are reacted using the procedure of Example 1.

| COMPONENT | AMOUNT |
| --- | --- |
| Ethox 2938 | 899.50 g |
| NaBH4 | 0.10 g |
| Dicyandiamide 99% | 3.49 g |
| Sulfamic acid | 118.91 g |
| Monoethanolamine | 3.49 g |
| IPA | 244.05 g |
| H2O | 360.26 |
| Total | 1629.88 g |

The weight of final product is 1474.1 grams (yield 90.9%). The pH (10%) is 7.5 and the % Solids is 62.65. The % activity is 57.2.

Example 5

The following components are reacted using the procedure of Example 1.

| COMPONENT | AMOUNT | % BY WEIGHT |
| --- | --- | --- |
| Ethox 2938 (anhydrous) | 1002.7 | 53.7647% |
| Sulfamic Acid | 117.8 | 6.3164 |
| NaBH4 | 0.11 | 0.0059 |
| Dicyandiamide | 2.27 | 0.1217 |
| Monoethanolamine | 6.1 | 0.3271 |
| Dimethylformamide | 736 | 39.4642 |
| | 1864.98 | 100.0000% |

Example 6

The following components shown in the Table below are reacted using the procedure of Example 1.

| Component | Amount | F.W. | Moles |
| --- | --- | --- | --- |
| Ethox 2938 anhyd. | 1002.7 grams | 826.2 | 1.2136 |
| Sulfamic Acid | 117.8 grams | 97.1 | 1.2136 |
| NaBH4 | 0.11 grams | | |
| Dicyandiamide | 2.27 grams | | |
| Monoethanol amine | 6.1 grams | | |
| DMF (Dimethyl formamide) | 730 grams | | |

A 10% solution of the above product has a pH of about 6.7 The % solids is 60.3. The Specific Gravity is 1.082/1.050–1.110.

Example 7

A mixture consisting of 38% by weight of carbon black, 10% of the sulfated product of Example 1, 10% by weight of ethylene glycol and 42% by weight of water is homogenized by stirring and is then ground in a continuously operating stirred ball mill to produce stable dispersions.

Example 8

A mixture consisting of 11.1 kg of 1% strength aqueous ammonia, 18.0 kg of titanium dioxide pigment (rutile type) 15.0 kg of barium sulphate pigment, 10.5 kg of ground dolomite, 2.0 kg of talc, 0.3 kg of high-molecular silica for preventing the pigment from settling out in the paste, 0.1 kg of a commercially available preservative, 0.2 kg of sodium hexamethaphosphate, 0.3 kg of a commercially available antifoaming mixture, 0.5 kg of a nonionic emulsifier and 5.0 kg of a 3% strength aqueous solution of hydroxyethylcellulose is homogenised by means of a high-speed stirrer. It is then ground on a single-roll mill and 37 kg of an acrylic resin dispersion are added, while stirring vigorously.

A paint which is stable against flocculation is obtained by stirring 100 g of this white emulsion paint with 0.1 to 10 g of a pigment preparation produced in accordance with Example 7. When this paint is spread on paper with a 0.09 mm doctor blade, a distinctly greater depth of colour is obtained, compared with analogous emulsion paints.

Further Examples demonstrating the effectiveness of the dispersants of the invention are summarized in the Table below:

| PIGMENT CI COLOR # | VISCOSITY REDUCTION | COMMENTS |
| --- | --- | --- |
| RED # 266 | 20% | REPLACED 3 SURFACTANTS, NOTED STABILITY |
| RED # 122 | 12% | INCREASED SOLIDS 30% TO 40% PIGMENT |
| RED # 48:2 | 15% | INCREASED RESIN SOLIDS, INCREASED GLOSS |
| RED # 48:3 | 17% | INCREASED STABILITY, AND SOLIDS |
| RED # 57:1 | 20% | MOST NOTED STABILITY, |
| ORA # 16 | 15% | UNUSUAL PERFORMANCE IN INK BASE VEHICLE |
| ORA # 16 | 75% | REDUCED RESIN BY 50%, VISCOSITY REDUCED 75% |
| LAMP BLACK | 20% | SOLIDS INCREASE FROM 40% MAX, TO 52%, |
| YELL # 74 | 19% | SOLIDS NOT INCREASED, PERFORMANCE EXCEL, USE 9%, BASED ON 100% THEORETICAL SOLIDS |
| IRON OX RED | | NOTED STABILITY AT 17% DISPERSION |
| C VIOLET # 23 | 22% | ABLE TO INCREASE RESIN FOR ADDED GLOSS |
| M VIOLET # 27 | 20% | STABILITY INCREASED DRAMATICALLY |
| RED # 162 | 20% | 4% BETTER COLOR YIELD |

Although the present invention has been described with reference to specific details of certain embodiments thereof, it is not intended that such detail should be regarded as limitations upon the scope of the invention, except as and to the extent that they are included in the accompanying claims.

What is being claimed is:

1. An aqueous pigment dispersion having increased stability consisting of, in addition to water:
   (a) a pigment; and
   (b) an anionic surfactant selected from the group consisting of surfactants having the formulae:

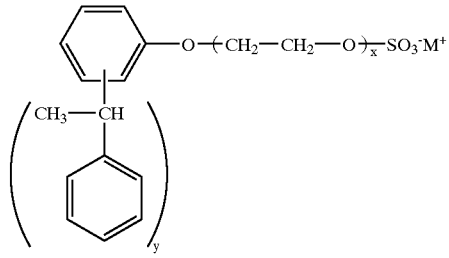

(i)

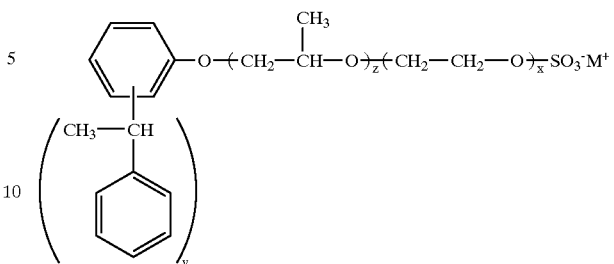

(ii)

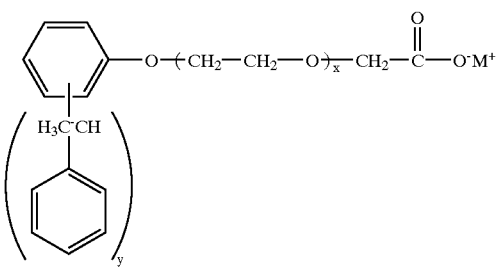

(iii)

wherein x=11–12; y=2.0–2.3; z=1–70 and $M^+$ is selected from the group consisting of $NH_4^+$, $Na^+$, $K^+$, $C_1$–$C_4$ alkyl ammonium, $C_1$–$C_4$ dialkylammonium, $C_1$–$C_4$ trialkylammonium, monoethanol-ammonium, diethanolammonium and triethanolammonium, and wherein said surfactant provides a viscosity reduction of 12% to 75% to said dispersion.

2. The pigment dispersion of claim 1 wherein said pigment is carbon black.

3. A coloring pigment dispersion having increased stability which is free from organic solvents consisting of:
   (a) 1.0–60% by weight of a coloring pigment;
   (b) 5–30% by weight of an anionic surfactant selected from the group consisting of surfactants having the formulae:

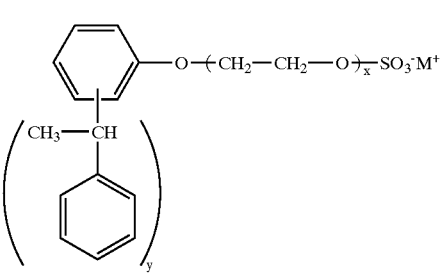

(i)

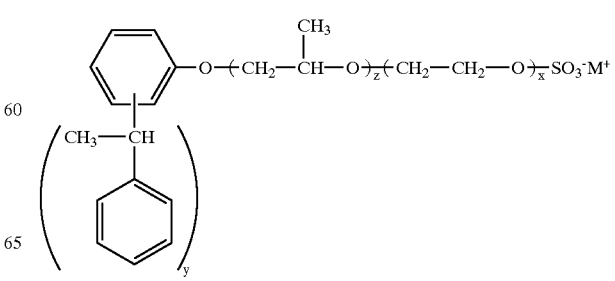

(ii)

(iii)

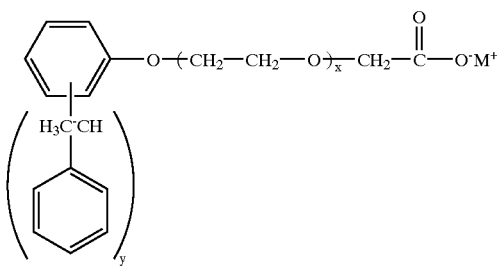

wherein x=11–12; y=2.0–2.3; z=1–70 and $M^+$ is selected from the group consisting of $NH_4^+$, $Na^+$, $K^+$, $C_1$–$C_4$ alkyl ammonium, $C_1$–$C_4$ dialkylammonium, $C_1$–$C_4$ trialkylammonium, monoethanol-ammonium, diethanolammonium and triethanolammonium; and wherein said surfactant provides a viscosity reduction of 12% to 75% to said dispersion;

(c) 20–75% by weight of water; and (d) 0–5% by weight of auxiliary additives selected from the group consisting of antifoaming agents, and nonionic surfactants.

4. An aqueous carbon black dispersion having increased stability consisting of, in addition to water, the following components:

5 to 50% by weight of carbon black; and 0.5 to 30% by weight of an anionic surfactant selected from the group consisting of surfactants having the formulae:

(i)

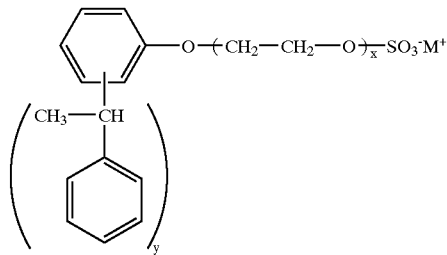

(ii)

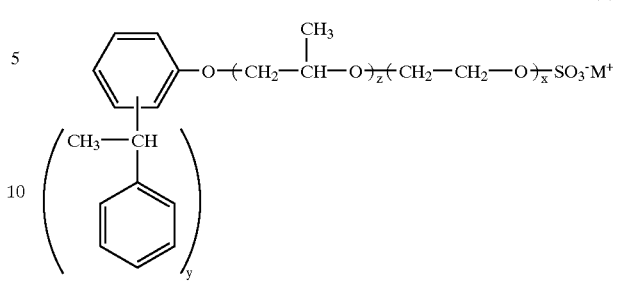

(iii)

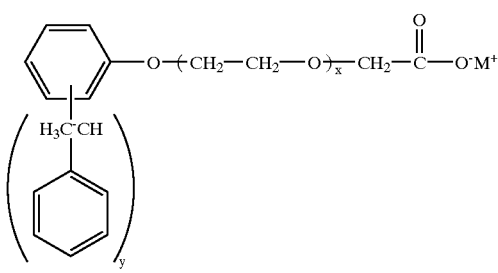

wherein x=11–12; y=2.0–2.3; z=1–70 and $M^+$ is selected from the group consisting of $NH_4^+$, $Na^+$, $K^+$, $C_1$–$C_4$ alkyl ammonium, $C_1$–$C_4$ dialkylammonium, $C_1$–$C_4$ trialkylammonium, monoethanol-ammonium, diethanolammonium and triethanolammonium, and wherein said surfactant provides a viscosity reduction of 12% to 75% to said dispersion.

* * * * *